(12) United States Patent
Takemoto et al.

(10) Patent No.: US 7,403,201 B2
(45) Date of Patent: Jul. 22, 2008

(54) THREE-DIMENSIONAL VIDEO PROVIDING METHOD AND THREE-DIMENSIONAL VIDEO DISPLAY DEVICE

(75) Inventors: Satoshi Takemoto, Gifu (JP); Goro Hamagishi, Osaka (JP); Toshio Nomura, Tokyo (JP)

(73) Assignees: Sanyo Electric Co., Ltd., Osaka (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/542,728

(22) PCT Filed: Jan. 19, 2004

(86) PCT No.: PCT/JP2004/000376

§ 371 (c)(1),
(2), (4) Date: Jul. 20, 2005

(87) PCT Pub. No.: WO2004/071102

PCT Pub. Date: Aug. 19, 2004

(65) Prior Publication Data

US 2006/0050383 A1   Mar. 9, 2006

(30) Foreign Application Priority Data

Jan. 20, 2003 (JP) ............................. 2003-010804

(51) Int. Cl.
*G06T 15/00* (2006.01)
(52) U.S. Cl. ........................................ 345/419; 348/51
(58) Field of Classification Search .......... 345/419–627
See application file for complete search history.

(56) References Cited

U.S. PATENT DOCUMENTS

| | | | | |
|---|---|---|---|---|
| 5,257,345 A | * | 10/1993 | Malm | 345/419 |
| 5,856,829 A | * | 1/1999 | Gray et al. | 345/422 |
| 6,208,348 B1 | * | 3/2001 | Kaye | 345/419 |
| 6,285,779 B1 | * | 9/2001 | Lapidous et al. | 382/106 |
| 6,313,866 B1 | * | 11/2001 | Akamatsu et al. | 348/51 |
| 6,351,572 B1 | * | 2/2002 | Dufour | 382/285 |
| 6,477,260 B1 | * | 11/2002 | Shimomura | 382/106 |
| 6,590,573 B1 | * | 7/2003 | Geshwind | 345/419 |
| 6,677,945 B2 | * | 1/2004 | Lapidous et al. | 345/422 |
| 7,161,614 B1 | * | 1/2007 | Yamashita et al. | 348/42 |
| 2001/0010517 A1 | * | 8/2001 | Iimura et al. | 345/426 |
| 2002/0118275 A1 | | 8/2002 | Harmann | |

(Continued)

FOREIGN PATENT DOCUMENTS

JP            09-289638            11/1997

(Continued)

*Primary Examiner*—Mark Zimmerman
*Assistant Examiner*—David H Chu
(74) *Attorney, Agent, or Firm*—McDermott Will & Emery LLP

(57) ABSTRACT

A transmitting-side device (1) generates an image data by performing an image analysis toward the actually photographed two-dimensional image (100) and also generates depth information useful for converting the two-dimensional image into a stereoscopic vision-use image. Furthermore, the transmitting-side device generates additional subordinate information such as scale information, function specifying information, table specifying information, and the like, and transmits such the information to a receiving-side device (2). The receiving-side device (2) receives the image data, the depth information, and the additional subordinate information, generates a parallax image on the basis of such the information, and allows an observer to perform stereoscopic vision.

10 Claims, 12 Drawing Sheets

U.S. PATENT DOCUMENTS

| | | | |
|---|---|---|---|
| 2002/0154116 A1* | 10/2002 | Nakatsuka et al. | 345/426 |
| 2002/0180731 A1* | 12/2002 | Lapidous et al. | 345/422 |
| 2004/0054531 A1* | 3/2004 | Asano | 704/231 |
| 2005/0270284 A1* | 12/2005 | Martin | 345/419 |
| 2007/0195082 A1* | 8/2007 | Takanashi et al. | 345/419 |

FOREIGN PATENT DOCUMENTS

| | | |
|---|---|---|
| JP | 2000-078611 | 3/2000 |
| JP | 3096613 | 8/2000 |
| JP | 2001-061164 | 3/2001 |
| JP | 2001-320731 | 11/2001 |
| JP | 2002-152776 | 5/2002 |
| KR | 1020040022100 A | 3/2004 |
| WO | WO 02/13143 | 2/2002 |

* cited by examiner

FIG. 4
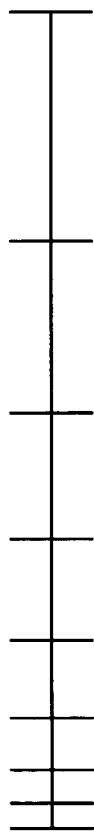
(a)  (b) ←SCREEN FACE
LOGARITHM TYPE         CONCENTRATION AT THE CENTER TYPE
                       (POWER OF A NUMBER, LOGARITHM, ETC)

FIG. 8
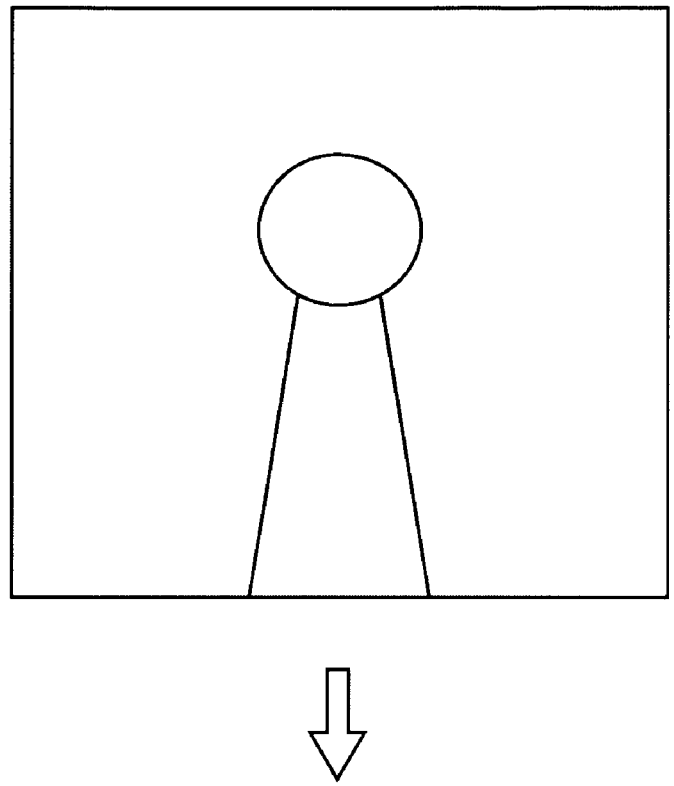
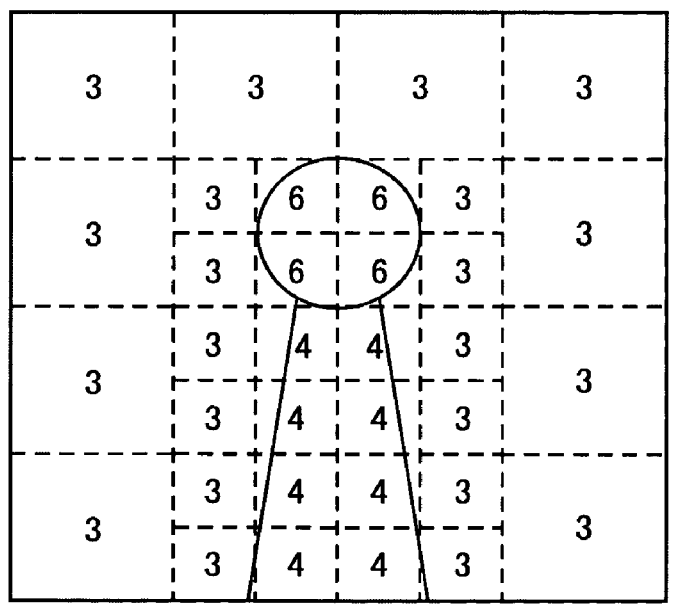
(NUMERICAL VALUES REPRESENT SIZES OF BITS)

FIG. 9
(a)
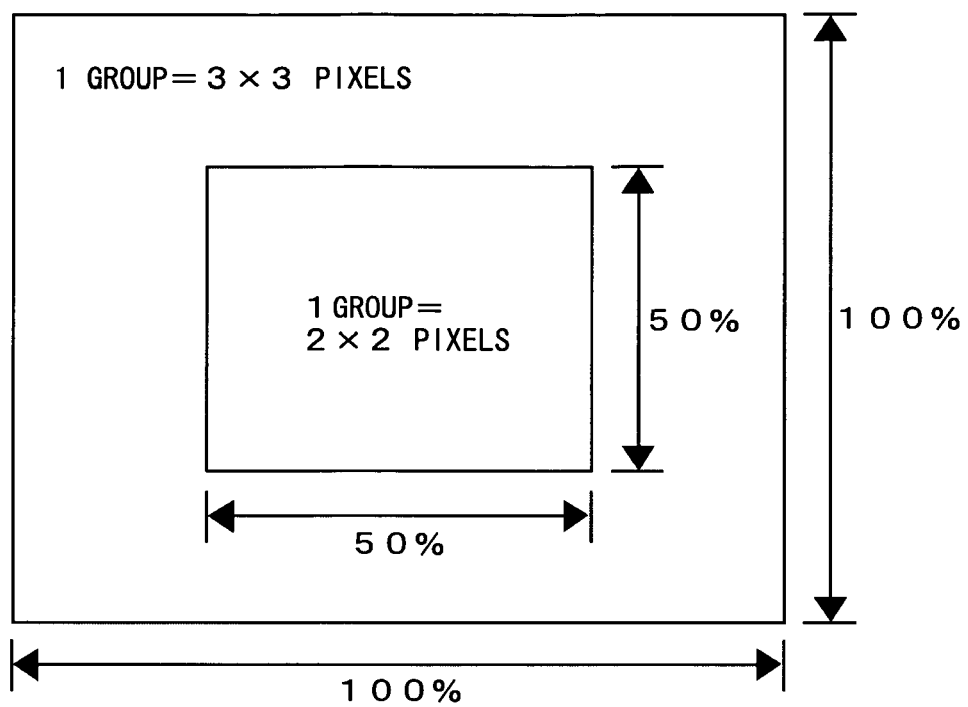
(b)
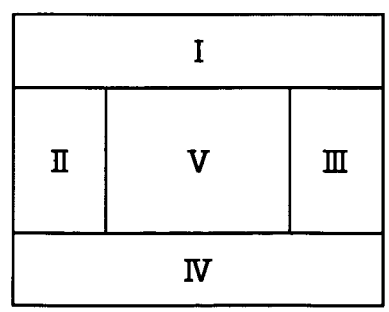

FIG. 11
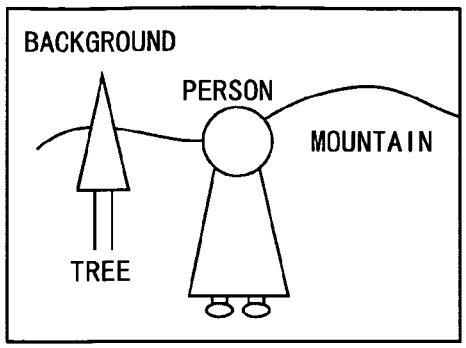
IMAGE NUMBER 1
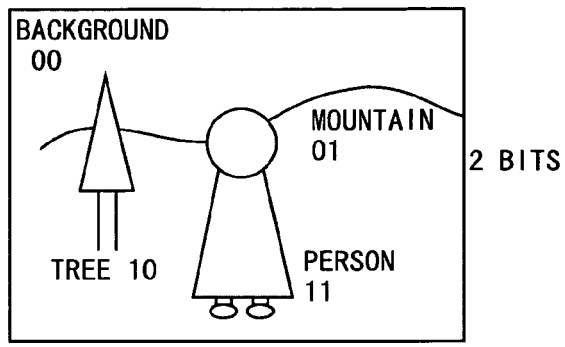
IMAGE NUMBER 2:
DEPTH MAP DEPENDING ON
IMAGE NUMBER 1
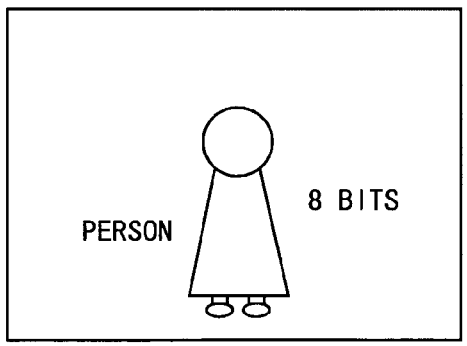
IMAGE NUMBER 3:
DEPTH MAP DEPENDING ON
DEPTH 11 OF IMAGE NUMBER 2
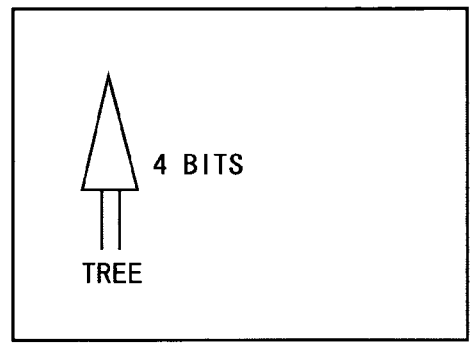
IMAGE NUMBER 4:
DEPTH MAP DEPENDING ON
DEPTH 10 OF IMAGE NUMBER 2
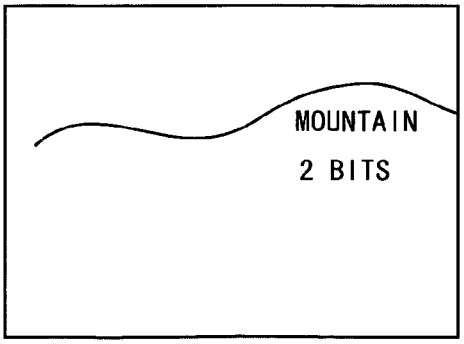
IMAGE NUMBER 5:
DEPTH MAP DEPENDING ON
DEPTH 01 OF IMAGE NUMBER 2

FIG. 12
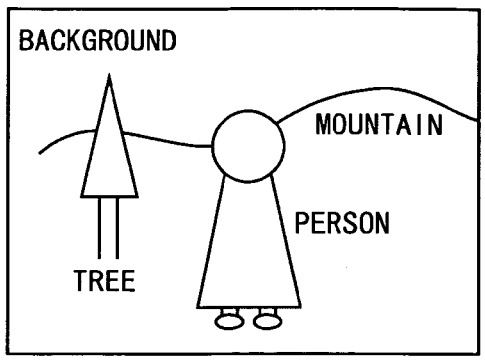
IMAGE NUMBER 1
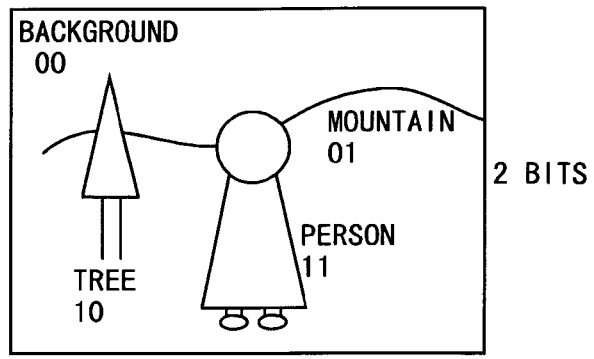
IMAGE NUMBER 2 :
DEPTH MAP DEPENDING ON
IMAGE NUMBER 1
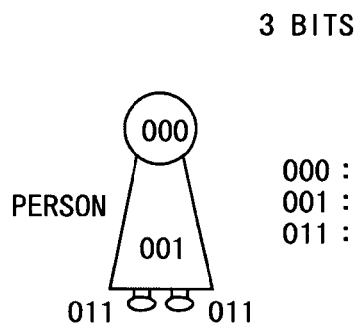
000 : SPHERE
001 : TRIANGULAR PYRAMID
011 : CYLINDER
SHAPE DATA DEPENDING
ON DEPTH 11 OF IMAGE
NUMBER 2
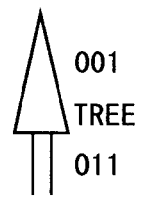
SHAPE DATA DEPENDING
ON DEPTH 10 OF IMAGE
NUMBER 2
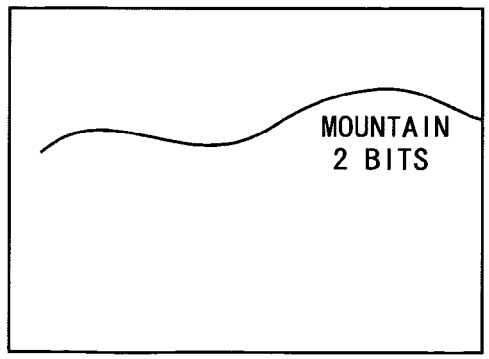
IMAGE NUMBER 3 :
DEPTH MAP DEPENDING ON
DEPTH 01 OF IMAGE NUMBER 2

THREE-DIMENSIONAL VIDEO PROVIDING METHOD AND THREE-DIMENSIONAL VIDEO DISPLAY DEVICE

TECHNICAL FIELD

The present invention relates to a stereoscopic vision-use image providing method and a stereoscopic image display device.

BACKGROUND ART

As a prior art, there is proposed a stereoscopic image receiver and a stereoscopic image system that generate a stereoscopic image on the basis of depth information extracted from a two-dimensional video signal and the two-dimensional video signal (see Japanese Patent Laying-open No. 2000-78611).

With the above-described prior art, it is possible to generate a stereoscopic vision-use image that is allowed to have parallax information from an actually photographed two-dimensional image. However, in the above-described prior art, it has not been realized to display various stereoscopic images and reduce an amount of information to be transmitted.

SUMMARY OF THE INVENTION

In view of the foregoing circumstances, it is an object of the present invention to provide a stereoscopic vision-use image providing method and a stereoscopic image display device capable of displaying various stereoscopic images and reducing an amount of information to be transmitted.

In order to solve the above-mentioned problem, the stereoscopic vision-use image providing method of the present invention is a stereoscopic vision-use image providing method, in which, at a time that a two-dimensional image is provided as data, depth information useful for converting the data of the two-dimensional image into a stereoscopic vision-use image and scale information of values of the depth information are provided as subordinate information of the two-dimensional image together with the data of the two-dimensional image.

With the above-described configuration, the scale information is provided as subordinate information of the two-dimensional image together with the data of the two-dimensional image, so that it is possible to allow a stereoscopic vision-use image having various depths, large and small, to be generated on a side to be provided.

Furthermore, a stereoscopic vision-use image providing method of the present invention is a stereoscopic vision-use image providing method, in which, at a time that a two-dimensional image is provided as data, depth information useful for converting the data of the two-dimensional image into a stereoscopic vision-use image and definition information for allowing values corresponding to distances indicated by values of the depth information to have non-equal differences contrary to the values of the depth information having a uniform difference are provided as subordinate information together with the data of the two-dimensional image.

With the above-described configuration, it is possible to set desirable resolution at an arbitrary position on the depth, and the like, so that various stereoscopic image displays are rendered possible. The depth information may be information specifying an arbitrary function out of a group of functions. In addition, information indicating which value becomes an image displaying surface position out of the values of the depth information may be included in the subordinate information. Or, the definition information may be information specifying an arbitrary table out of a group of tables in which parallax amounts are predetermined with respect to the values of the depth information. Furthermore, the definition information may be set such that an area where the non-equal differences are large is formed at a position far from an observer, and an area where the non-equal differences are small is formed at a position close to the observer. Or, the definition information may be set such that an area where the non-equal differences are large is formed at a position far from an image displaying surface position, and an area where the non-equal differences are small is formed at a position close to the image displaying surface position.

Furthermore, a stereoscopic vision-use image providing method of the present invention is a stereoscopic vision-use image providing method, in which, at a time that a two-dimensional image is provided as data, depth information expressed by different size of bits depending on a screen area of the two-dimensional image is provided as subordinate information of the two-dimensional image together with the data of the two-dimensional image.

With the above-described configuration, compared to a case in which the size of bits is uniformly set throughout a screen of the two-dimensional image, it is possible to allow a high-quality stereoscopic vision-use image to be generated on the side to be provided, while reducing an amount of depth information to be provided. The size of bits of the depth information may be rendered smaller in a peripheral area of the two-dimensional image than in a center area of the two-dimensional image. Moreover, information indicating by how many bits at which area to express the depth information may be provided as subordinate information together with the data of the two-dimensional image. In addition, information indicating by how many bits for each pixel to express the depth information may be provided as subordinate information together with the data of the two-dimensional image.

Furthermore, a stereoscopic vision-use image providing method of the present invention is a stereoscopic vision-use image providing method, in which, at a time that a two-dimensional image is provided as data, depth information of the same value used in common is provided with respect to a plurality of pixels of the two-dimensional image as subordinate information of the two-dimensional image.

With the above-described configuration, compared to a case in which individual depth information is set for all pixels in the two-dimensional image, it is possible to allow a high-quality stereoscopic vision-use image to be generated on the side to be provided, while reducing an amount of depth information to be provided. The depth information of the same value used in common may be applied to a larger number of pixels in a peripheral area than in a center area of the two-dimensional image.

In addition, a stereoscopic vision-use image providing method of the present invention is a stereoscopic vision-use image providing method, in which, at a time that a two-dimensional image is provided as data, first depth information applied to each object in the two-dimensional image and second depth information applied to pixels constituting each object are provided as subordinate information of the two-dimensional image together with the data of the two-dimensional image.

With the above-described configuration, depth of each object in the two-dimensional image is applied by the first depth information and depth of pixels constituting each object is applied by the second depth information. Therefore, compared to a case in which individual depth information is set for all pixels in the two-dimensional image, it is possible to allow a high-quality stereoscopic vision-use image to be generated on the side to be provided, while reducing the amount of depth information to be provided.

Furthermore, a stereoscopic vision-use image providing method of the present invention is a stereoscopic vision-use image providing method, in which, at a time that a two-dimensional image is provided as data, depth information applied to each object in the two-dimensional image and shape information of each object are provided as subordinate information of the two-dimensional image together with the data of the two-dimensional image.

With the above-described configuration, as a result of the depth of each object in the two-dimensional image being applied by the depth information and also shape information of each of the object being applied, it is possible to obtain the depth of pixels constituting each object by utilizing a depth value table for each shape retained on the side to be provided. Therefore, compared to a case in which individual depth information is set for all pixels in the two-dimensional image, it is possible to allow a high-quality stereoscopic vision-use image to be generated on the side to be provided, while reducing the amount of depth information to be provided.

In such the stereoscopic vision-use image providing methods, information may be provided by any one of methods such as broadcasting, communications, and a recording into a recording medium.

Furthermore, a stereoscopic image display device of the present invention is a stereoscopic image display device that generates a stereoscopic vision-use image by utilizing obtained data of a two-dimensional image and subordinate information thereof, and comprises a means for obtaining scale information and depth information from the subordinate information, a means for generating a parallax amount on the basis of the scale information and the depth information, and a means for generating a stereoscopic vision-use image on the basis of the parallax amount.

Moreover, a stereoscopic image display device of the present invention is a stereoscopic image display device that generates a stereoscopic vision-use image by utilizing obtained data of a two-dimensional image and subordinate information thereof, and comprises a means for obtaining depth information and function specifying information from the subordinate information, a means for storing a plurality of functions for allowing values corresponding to distances indicated by values of the depth information to have non-equal differences contrary to the values of the depth information having a uniform difference, a means for selecting a function on the basis of the function specifying information, a means for generating a parallax amount on the basis of the selected function and the depth information, and a means for generating a stereoscopic vision-use image on the basis of the parallax amount.

With the above-described configuration, a stereoscopic image display device may be configured such that a depth value applying a standard parallax amount is determined on the basis of information indicating an image displaying surface position.

Moreover, a stereoscopic image display device of the present invention is a stereoscopic image display device that generates a stereoscopic vision-use image by utilizing obtained data of a two-dimensional image and subordinate information thereof, and comprises a means for obtaining depth information and table specifying information from the subordinate information, a means for storing a plurality of tables for allowing values corresponding to distances indicated by values of the depth information to have non-equal differences contrary to the values of the depth information having a uniform difference, a means for selecting a table on the basis of the table specifying information, a means for generating a parallax amount on the basis of the selected table and the depth information, and a means for generating a stereoscopic vision-use image by utilizing the parallax amount.

Furthermore, a stereoscopic image display device of the present invention is a stereoscopic image display device that generates a stereoscopic vision-use image by utilizing obtained data of a two-dimensional image and subordinate information thereof, and comprises a means for generating a stereoscopic vision-use image by applying depth information expressed by different size of bits depending on a screen area of the two-dimensional image to each pixel of screen areas in a case that the depth information expressed by different size of bits depending on the screen area is obtained from the subordinate information.

Moreover, a stereoscopic image display device of the present invention is a stereoscopic image display device that generates a stereoscopic vision-use image by utilizing obtained data of a two-dimensional image and subordinate information thereof, and comprises a means for generating a stereoscopic vision-use image by applying depth information of the same value used in common to a plurality of pixels in the two-dimensional image in a case that pieces of depth information of which number is fewer than the number of pixels in the two-dimensional image are obtained from the subordinate information.

In addition, a stereoscopic image display device of the present invention is a stereoscopic image display device that generates a stereoscopic vision-use image by utilizing obtained data of a two-dimensional image and subordinate information thereof, and comprises a means for obtaining first depth information applied to each object in the two-dimensional image and second depth information applied to pixels constituting each object from the subordinate information, a means for generating depth information of each pixel by adding the second depth information to the first depth information, and a means for generating a stereoscopic vision-use image on the basis of the depth information of each pixel.

Furthermore, a stereoscopic image display device of the present invention is a stereoscopic image display device that generates a stereoscopic vision-use image by utilizing obtained data of a two-dimensional image and subordinate information thereof, and comprises a means for obtaining depth information applied to each object in the two-dimensional image and shape information of each object from the subordinate information, a means for storing tables relating each pixel in a pixel group constituting each shape to the depth information, a means for selecting the table on the basis of the shape information, a means for generating depth information of each pixel by adding the depth information obtained from the table to the depth information applied to each object, and a means for generating a stereoscopic vision-use image on the basis of the depth information of the each pixel.

BRIEF DESCRIPTION OF THE DRAWINGS

Portions (a), (b), and (c) in FIG. 1 are descriptive diagrams showing a stereoscopic vision-use image providing method and a stereoscopic image display device according to an embodiment of the present invention;

FIGS. 4(a) and (b) are descriptive diagrams respectively showing that values corresponding to distances indicated by values of depth information are allowed to have non-equal differences contrary to the values of the depth information having a uniform difference;

FIG. 8 is a descriptive diagram showing another example in which depth information is different depending on a position on an image;

FIG. 9(a) is a descriptive diagram showing that depth information of the same value used in common is applied to a plurality of pixels of a two-dimensional image;

FIG. 9(b) is a descriptive diagram showing a transmitting manner of the depth information;

Figure 10:
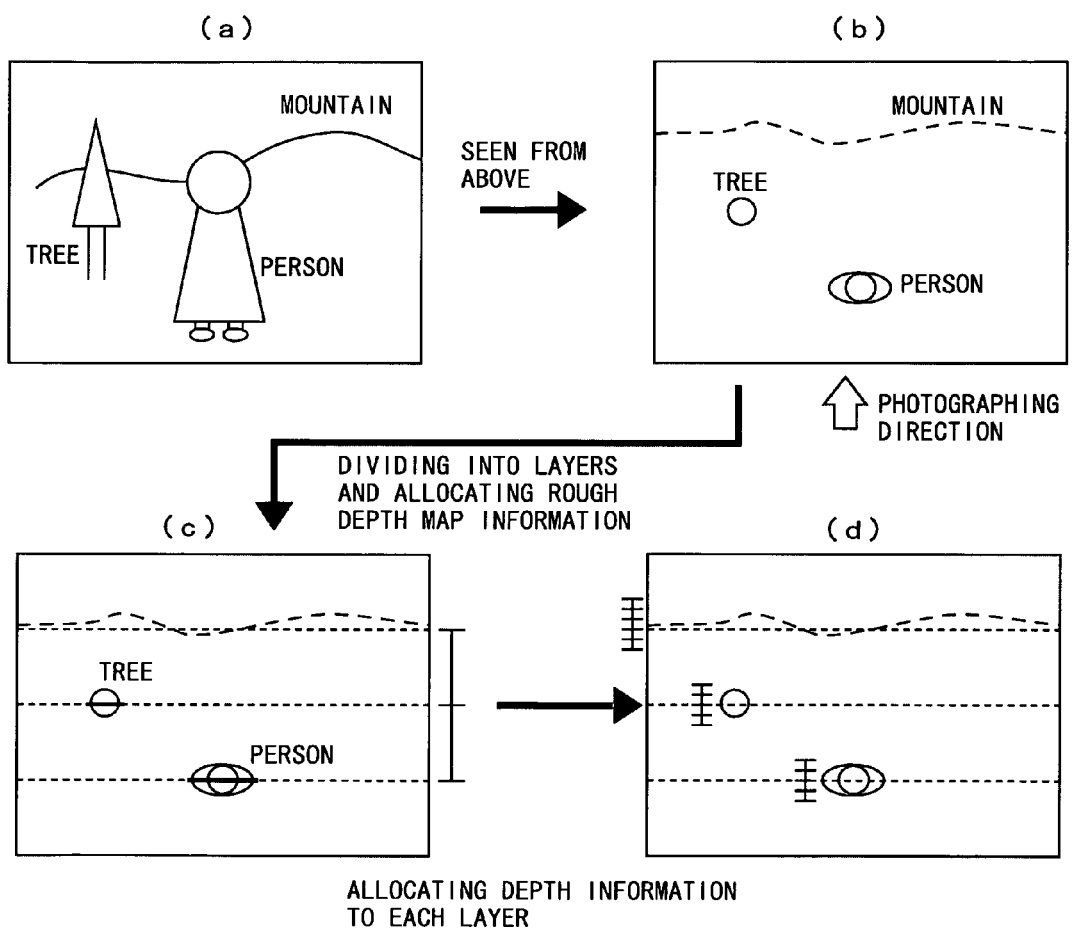

Portions (a), (b), (c), and (d) in FIG. 10 are descriptive diagrams showing another example of a method of applying depth information;

FIG. 11 is a descriptive diagram showing a concrete example of FIG. 10; and

FIG. 12 is a descriptive diagram showing another concrete example of FIG. 10.

BEST MODE FOR PRACTICING THE INVENTION

Hereinafter, a stereoscopic vision-use image providing method and a stereoscopic image display device will be described referring to FIGS. 1 to 12.

Generation of a stereoscopic image by a two-dimensional image and a depth map (depth information) will be described on the basis of FIG. 1. It is noted that, this Figure shows a system composed of a transmitting-side device 1 structured as a broadcast station, a server on the Internet, or the like, and a receiving-side device 2 including a broadcast receiver, and a personal computer, a mobile telephone, or the like, equipped with and an Internet connection environment.

Figure 1:
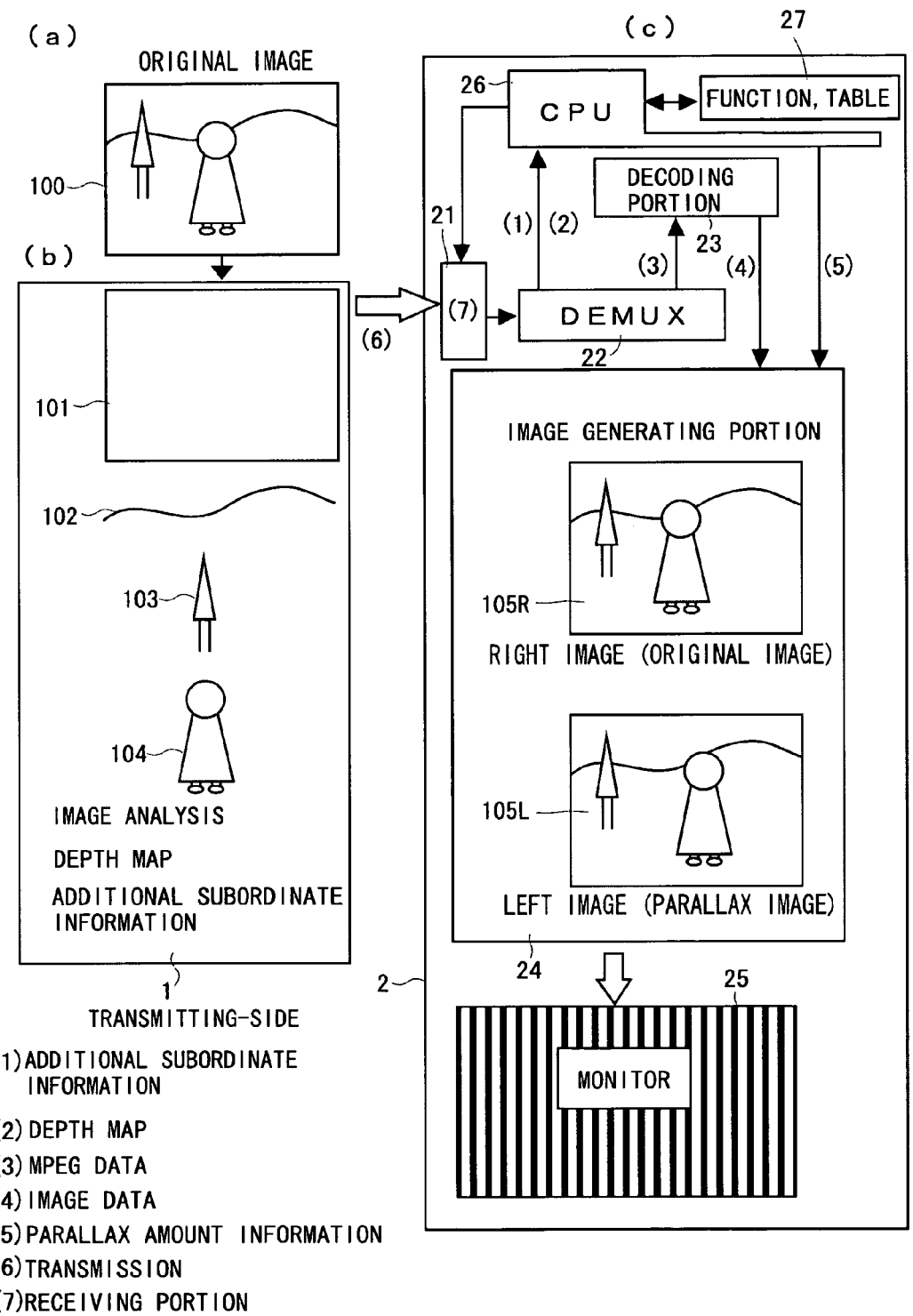

A portion (a) in FIG. 1 illustrates a two-dimensional image 100 that is an original image. The transmitting-side device 1 performs an image analysis toward the two-dimensional image 100, and extracts a background image 101, a mountain image 102, a tree image 103, and a person image 104 as shown in a portion (b) in FIG. 1. These extracted images are handled as objects (for example, edge information). Moreover, a depth value is applied for each pixel and the depth map is generated. It is noted that it is also possible to apply the depth value for each object. The depth value may be applied automatically (presumptively), or may be applied by a manual procedure.

Thus, the transmitting-side device 1 transmits the depth map as subordinate information of the images in providing (transmitting, broadcasting) the images. Furthermore, in this embodiment, additional subordinate information is transmitted. The additional subordinate information will be described later. In a case of digital broadcasting, multiplex broadcasting is possible by multiplexing image data and various kinds of subordinate information on one transport stream. In a delivery using a computer network, too, it is possible to multiplex the image data and various kinds of subordinate information.

Figure 2:
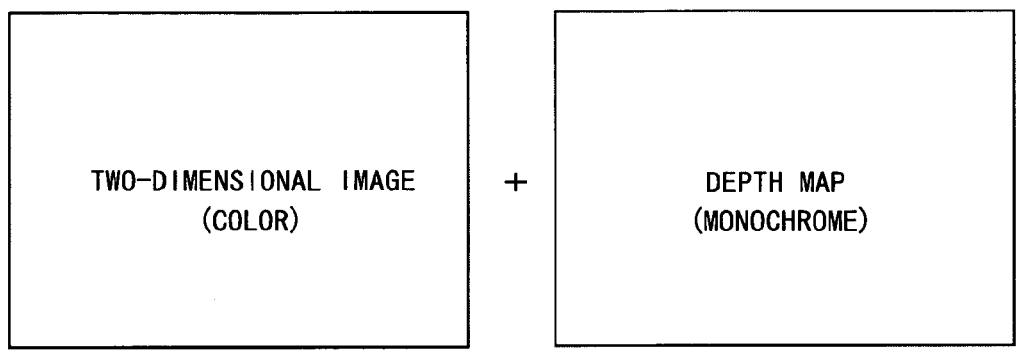
FIG. 2 is a descriptive diagram showing a two-dimensional image and a depth map attached thereto.

Incidentally, in a case of generating the stereoscopic vision-use image by the two-dimensional image and the depth map, it is possible to regard the depth map as a kind of two-dimensional image. Accordingly, as shown in FIG. 2, two images, which are two-dimensional image and the depth map, may be provided. Therefore, a concept similar to that of providing two images, which are an L-image and an R-image, in a two-viewpoint type stereoscopic vision may be adopted. However, in a case of images for the two-viewpoint type stereoscopic vision and multi-viewpoint type stereoscopic vision, formats do not differ from viewpoint image to viewpoint image. On the other hand, in a case of generating the stereoscopic vision-use image by the two-dimensional image and the depth map, the depth map may be a monochrome image in which several bits are allocated to each pixel. Therefore, it may predetermined that each pixel of the depth map (depth information corresponding to each pixel in the two-dimensional image) is expressed by how many bits, or information indicating a size (number) of bits for each pixel may be provided from the transmitting-side device 1 to the receiving-side device 2. In addition, in a case of expressing the depth map as the monochrome image, it is determined whether the depth map shows a value indicating a close distance when the image is whiter or the depth map shows the value indicating a close distance when the image is blacker. This also may be predetermined, or information indicating the determination may be transmitted from the transmitting-side.

[Additional Subordinate Information]

Figure 3:
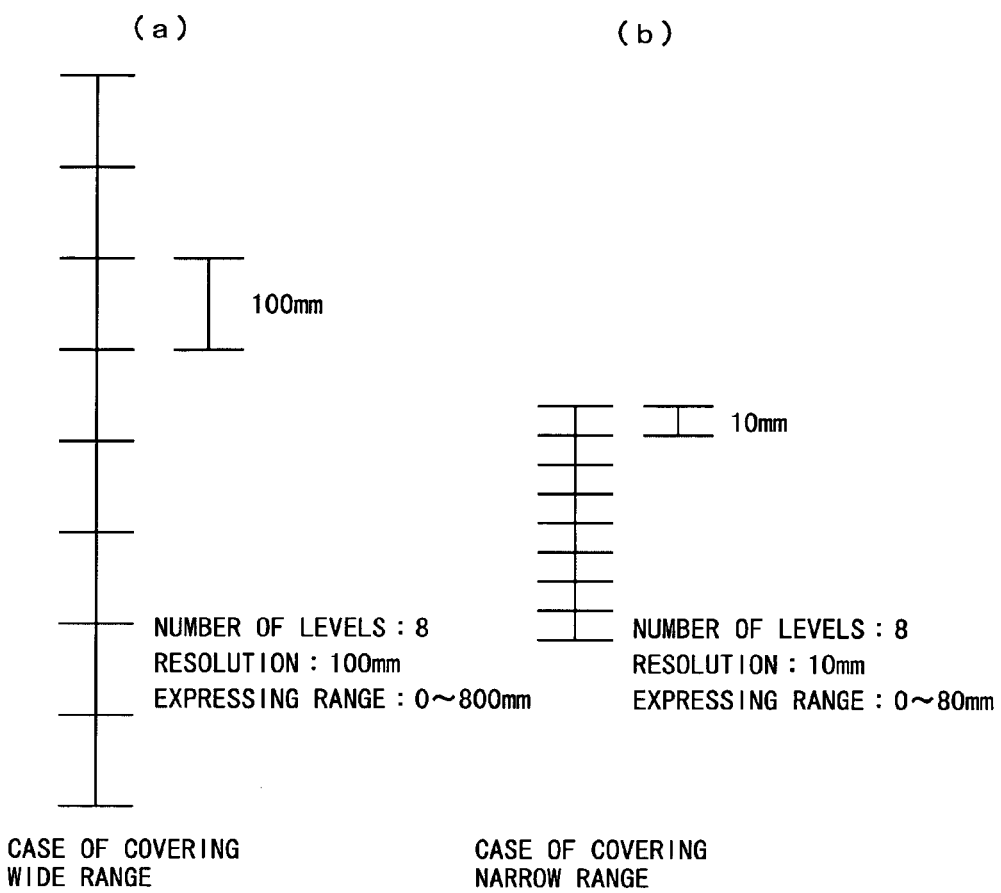
FIGS. 3(a) and (b) are descriptive diagrams respectively showing a relationship between resolution and an expressing range.

① The transmitting-side device 1, when providing the two-dimensional image as data, transmits the depth map and scale information of values of the depth map as subordinate information of the two-dimensional image together with the data of the two-dimensional image. It is preferable to assume that the size of bits for each pixel of the depth map is decided, and further, to show a relationship between resolution and a constant and concrete value corresponding to a distance. FIG. 3 illustrates a case where a depth value of one pixel is expressed with 3 bits. (Although, in reality, it is not probable for the depth value to be expressed with 3 bits, the depth value is expressed with 3 bits only for the sake of convenience of description.) In a case where 3 bits are allocated to one pixel, it is possible to express eight levels of depths. Scale information is transmitted in order to show to how much constant and concrete distance one graduation of the depths corresponds. In FIG. 3(a), the resolution is 100 millimeters (mm), so that it is possible to cover a wide range of 0 (zero) millimeters (mm) to 800 millimeters (mm). In addition, in FIG. 3(b), the resolution is 10 millimeters (mm), so that it is possible to cover a narrow range of 0 (zero) millimeters (mm) to 80 millimeters (mm). Therefore, by transmitting the scale information, it is possible to allow the receiving-side device 2 to produce the stereoscopic vision-use image having various depths, large and small.

② The transmitting-side device 1, when providing the two-dimensional image as data, transmits the depth map and definition information for allowing values corresponding to distances indicated by values of the depth information to have non-equal differences contrary to the values of the depth information having a uniform difference as subordinate information together with the data of the two-dimensional image.

Figure 5:
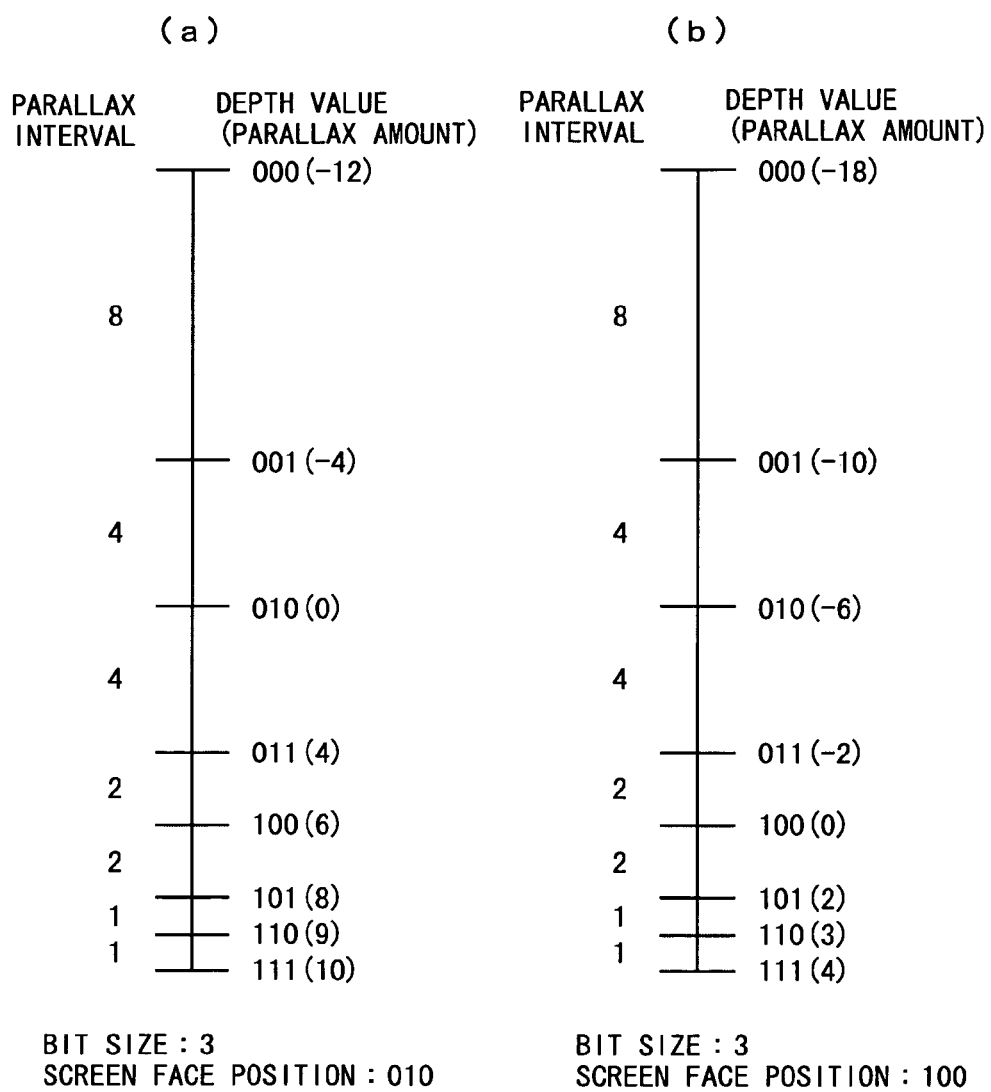
FIGS. 5(a) and (b) are descriptive diagrams respectively showing that values corresponding to distances indicated by values of depth information are allowed to have non-equal differences contrary to the values of the depth information having a uniform difference.

In the aforementioned FIG. 3, a case where the depths are expressed in equal intervals is shown. However, it is not always necessary that the depths are expressed in equal intervals. As for the resolution of the depths, the resolution may be high on a near side, and the resolution may be low on a far side, for example. Accordingly, in a case where the size of bits for each pixel is limited, there may be a case where it is more effective to express depths in non-equal intervals. In FIG. 4(a), a logarithm type expression, in which the resolution is high on the near side, is shown. More detail will be described using FIG. 5. In FIG. 5, it is defined that M is a maximum depth value (herein, 7 (111)), the depth value A is a positive number from 1 to M, B=(M−A)/2, and a parallax interval between the depth value A and A−1 is 2 to the power of B. In FIG. 5(a), a position of a screen face is (010), and in FIG. 5(b), the position of the screen face is (100). In a case where the above-described function is used, the resolution becomes high on the near side (the side of an observer) irrespective of the position of the screen face.

Figure 6:
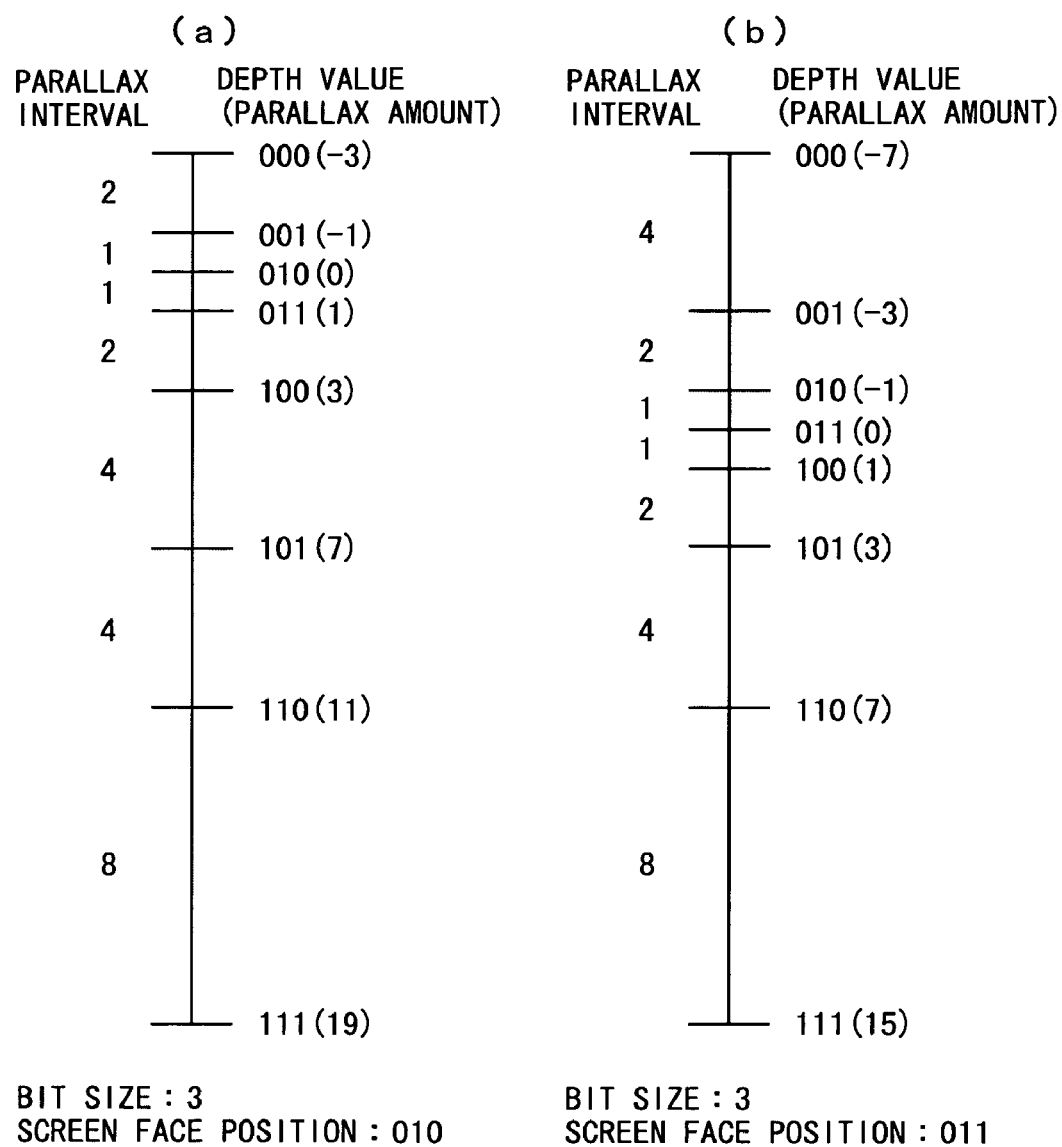
FIGS. 6(a) and (b) are descriptive diagrams showing that values corresponding to distances indicated by values of depth information are allowed to have non-equal differences contrary to the values of the depth information having a uniform difference.

On the other hand, in an example shown in FIG. 4(b), the closer the position is to the screen face (an image displaying surface position), the higher the resolution of the depth is, and the farther the position is from the screen face, the lower the resolution of the depth is. More detail will be described using FIG. 6. In FIG. 6, a difference between a maximum parallax (positive) and a minimum parallax (negative) is 22, and it is prescribed that a procession of numerical values "1, 1, 2, 2, 4, 4, 8, 8" is used in order as the parallax intervals. Then, in FIG. 6(a), the position of the screen face is 010, and in FIG. 6(b), the position of the screen face is 011. This makes it possible that the depths near the position of the screen face are finely set.

In a case where the values corresponding to distances indicated by the values of the depth map are allowed to have non-equal differences as described above, it is possible to adopt a method in which one pattern of expression of the non-equal differences is fixedly decided between the transmitting-side and the receiving-side. However, it is preferable that the transmitting-side can freely specify one pattern of expression of the non-equal differences out of several patterns of expressions of the non-equal differences. In a case where two-bit specifying information is transmitted, for example, when four functions (the functions include afore-described prescription regarding the procession of numerical values) are prepared on the receiving-side, four kinds of expressions of the non-equal differences become possible. Furthermore, regarding the position of the screen face, too, it is possible to adopt a method in which one position of the screen face is fixedly decided between the transmitting-side and the receiving-side (for example, the position of the screen face is fixedly set at 010, etc.). However, it is preferable that the transmitting-side can specify an arbitrary position of the screen face. In this case, if the position of the screen face is set at 010, 010 may be transmitted as information indicating the position of the screen face.

The present invention is not limited to the above-described expressions of the non-equal differences using the functions, and however, the receiving-side may have a table. Needless to say, a plurality of such the tables may be prepared on the receiving-side and the table may be selected according to table specifying information sent from the transmitting-side.

Figure 7:
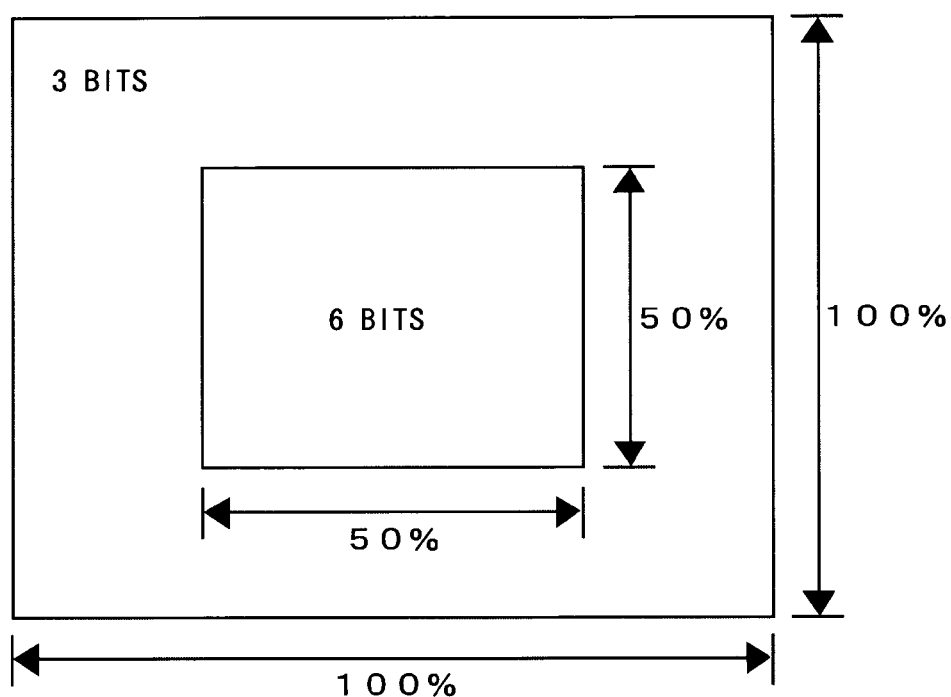
FIG. 7 is a descriptive diagram showing that the size of bits of depth information is 3 bits in a peripheral area of an image and 6 bits in a center area of 50%-by-50%.

③ The transmitting-side device 1, when providing the two-dimensional image as data, can also transmit the depth map expressed by different size of bits depending on a screen area of the two-dimensional image as subordinate information of the two-dimensional image together with the data of the two-dimensional image. In this case, it is preferable that the size of bits of the depth information is smaller in a peripheral area of the two-dimensional image than in a center area of the two-dimensional image. For example, as shown in FIG. 7, the size of bits in the peripheral area is three, and the size of bits in the central area of 50%-by-50% is six. It is possible to adopt a method in which one area-dividing pattern is fixedly decided between the transmitting-side and the receiving-side, and however, a plurality of area-dividing patterns may be prepared and an arbitrary pattern may be specified by the transmitting-side. Or, information indicating the size of bits may be written at the beginning of each pixel. When 0 (zero) is defined as 3 bits and 1 is defined as 6 bits, for example, it is possible that image information is written such as a pixel 1 (0 000), pixel 2 (0 000), pixel 3 (1 000000), . . . .

It is noted that the area is divided into two in the above-described area-dividing example, and however, this is not always the case. As shown in FIG. 8, the area may be divided into three areas such as a 3-bit area, a 4-bit area, and a 6-bit area. In addition, the area-dividing patterns may be different according to a content of an image (object arrangement situation) and a scene (according to a lapse of time). Furthermore, in a case of a person image shown in FIG. 8, it is possible to uniquely define structure of the person's face, body, and the like, so that a depth map table corresponding to the person image is prepared, and when an object to be photographed is a person, the depth map table corresponding to the person image is selected (selecting by an operator, or selecting by automatically determining the object to be photographed), thus, the area-dividing pattern shown in FIG. 8 can be selected automatically.

④ The transmitting-side device 1, when providing the two-dimensional image as data, transmits a depth map of the same value used in common with respect to a plurality of pixels of the two-dimensional image, as subordinate information of the two-dimensional image together with the two-dimensional image. As a basis, resolution of the depth map may be equal to that of the two-dimensional image, however this is not always the case. The resolution of the depth map may be different from that of the two-dimensional image. For example, one pixel of the depth map is allowed to correspond to 2-by-2 pixels of the two-dimensional image (resolution of the depth map is one-fourth of the resolution of the two-dimensional image). In addition, the depth information of the same value used in common may be applied to a larger number of pixels in a peripheral area of the two-dimensional image than in a center area of the two-dimensional image. As shown in FIG. 9(a), for example, common depth information is applied to 3-by-3 pixels as one group in the peripheral area, and common depth information is applied to 2-by-2 pixels as one group in the center area of 50%-by-50%. It is possible to adopt a method in which one area-dividing pattern is fixedly decided between the transmitting-side and the receiving-side, and however, a plurality of area-dividing patterns are prepared and an arbitrary pattern may be specified by the transmitting-side. In transmitting the depth map (monochrome image), as shown in FIG. 9(b), the image is divided into four areas (an area V corresponds to the center area of 50%-by-50%), and the divided image is transmitted successively by a unit of each area.

⑤ The transmitting-side device 1, when providing the two-dimensional image as data, transmits a first depth map applied to each object in the two-dimensional image and a second depth map applied to pixels constituting each object as subordinate information of the two-dimensional image together with the data of the two-dimensional image. That is, the objects are once expressed roughly by the depth map, and then, the depth map information is segmentalized and allocated to each object. FIG. 10 is a descriptive diagram showing a concept of such the method. A state of each depth of the objects in a case that a photographing state shown in the portion (a) in FIG. 10 is seen from above is shown in a portion (b) in FIG. 10. The state of the depth shown in the portion (b) in FIG. 10 does not exist as an image, and the state of the depth is applied as information at the time of photographing or editing. That is, as shown in a portion (c) in FIG. 10, the state of the depth is divided into rough layers, and layer information (the first depth map) is applied to each object located on the layers. Then, the second depth map information is allocated to pixels constituting each object. FIG. 11 shows a concrete example of an image transmission. An image of an image number 1 in FIG. 11 is transmitted as an original image, and an image of an image number 2 (the first depth map) is attached thereto. Furthermore, images which are the second depth map information of each object (an image number 3, an image number 4, and an image number 5) are attached thereto. That is, the images from the image number 1 to the image number 5 are transmitted from the transmitting-side, and one image is composed by using these five images on the receiving-side. Moreover, in this example, the size of bits of the second depth map information is different depending on each object. The person is 8 bits and the tree is 4 bits, for example.

⑥ The transmitting-side device 1, when providing the two-dimensional image as data, transmits the depth map applied to each object in the two-dimensional image and shape information of each object as subordinate information of the two-dimensional image together with the two-dimensional image. FIG. 12 shows a concrete example of such the image transmission. The image of the image number 1 in FIG. 12 is transmitted as an original image, and a monochrome image (depth map) of the image number 2 is attached thereto. Furthermore, shape information of components of each object, and the like, are attached thereto. The shape information, and the like, are composed of object numbers (for example, information indicating to which object, person, the tree, and the like, the number refers), component numbers (for example, information indicating to which component, a person's head, a body, legs, and the like, the number refers), shape information (information indicating in what shape the components are, a sphere, a cylinder, a cone, etc.), information indicating arrangement among components (for example, information indicating that the cylinder is located under a triangular pyramid with respect to the tree), and the like. A mountain, which is impossible to identify a shape, is transmitted as the monochrome image (depth map). The receiving-side composes one image using such the information.

[Receiving-Side Device]

As shown in the portion (c) in FIG. 1, the receiving-side device 2 receives image data, the depth map, and additional subordinate information. If these data are multiplexed, a demultiplexing (DEMUX) process is performed. As a decoding process on the image data, basically, a process based on MPEG, for example, and the like is adopted. In addition, the receiving-side device 2 generates an image for a right eye 105R and an image for a left eye 105L to which parallax is applied on the basis of the image data, the depth map, and the like. Therefore, the receiving-side device 2 is equipped with a receiving portion 21 (a modem, a tuner, and the like) for receiving data, a demultiplexer 22 (DEMUX), a decoding portion 23, a image generating portion 24 for generating a parallax image on the basis of data of the two-dimensional image and the depth map, etc., a monitor 25, and others.

The receiving-side device 2, as a result of being equipped with a liquid crystal barrier on a near side position of the monitor, allows performing both a display of a plane vision image and a display of a stereoscopic vision image. If the stereoscopic vision image is formed by alternately arranging the images for the right eye and the images for the left eye in a vertically-striped shape, vertically-striped shading areas are formed in the liquid crystal barrier by a control of a CPU 26. It is noted that, not only the configuration in which the stereoscopic vision image is formed by alternately arranging the image for the right eye and the image for the left eye in the vertically-striped shape, but a configuration in which the stereoscopic vision image is formed by obliquely arranging the images for the right eye and the images for the left eye (see Japanese Patent Publication No. 3096613) may be adopted, for example. In this case, an oblique barrier is formed in the liquid crystal barrier.

The CPU 26 of the receiving-side device 2 receives the aforementioned additional subordinate information from the demultiplexer 22, and performs an image display controlling process based on the subordinate information. Hereinafter, the image display controlling process will be described.

The CPU 26 of the receiving-side device 22 obtains scale information as the subordinate information and determines a parallax amount (a deviation (shift) amount of pixels) on the basis of the scale information and the depth map. That is, even if a depth value A is set for a certain pixel, a deviation (shift) amount of pixels in a parallax image differs from a case where the scale information is B to a case where the scale information is C (B ≠C). The CPU 26 applies parallax amount information to the image generating portion 24, and the image generating portion 24 generates a parallax image based on the parallax amount information.

The CPU 26 of the receiving-side device 2 obtains function specifying information as the subordinate information and selects a function on the basis of the function specifying information. A memory 27 stores a plurality of functions (definitions) for allowing the values corresponding to distances shown by the values of the depth map to have non-equal differences contrary to the values of depth information having a uniform difference. The CPU 26 calculates the parallax amount (the deviation (shift) amount of pixels) on the basis of the selected function and the received depth value. Herein, more specific description will be given using FIG. 5(*a*). The receiving-side device 2 obtains a parallax interval between the depth value A and A−1 on the basis of an operation of B=(M−A)/2 and an operation of 2 to the power of B. It is noted that, the parallax interval itself can be decided by the size of bits expressing the depth value. Therefore, the parallax interval may be related to the size of bits and stored in the memory 27, and then the parallax interval may be read out. The position of the screen face is a portion where the depth value is 010. When the received depth value is 101, 101 is larger than 010 by three graduations, so that the parallax amount 8 is obtained by an operation of 4+2+2. The CPU 26 applies the parallax amount information to the image generating portion 24, and the image generating portion 24 generates a parallax image on the basis of the parallax amount information.

The CPU 26 of the receiving-side device 2 obtains table specifying information and selects a table on the basis of the table specifying information. A plurality of tables relating the depth value to the parallax amount are stored in the memory 27. Taking the FIG. 5(*a*) as an example, a content of the table is decided such that 000=−12, 001=−4, 010=0, . . . . The CPU 26, for example, applies the received depth value as an address to the table, reads out the parallax amount information from the table, and applies the parallax amount information to the image generating portion 24. The image generating portion 24 generates a parallax image on the basis of the parallax amount information.

When the receiving-side device 2 complies with settings shown in FIGS. 5(a) and 5(b), the receiving-side device 2 generates the parallax image matching a condition that an area where the non-equal differences are large is formed at a position far from an observer, and an area where the non-equal differences are small is formed at a position close to the observer. In addition, when the receiving-side device 2 complies with settings shown in FIGS. 5(a) and 5(b), the receiving-side device 2 generates the parallax image matching a condition that an area where the non-equal differences are large is formed at a position far from an image displaying surface position, and an area where the non-equal differences are small is formed at a position close to the image displaying surface position.

The receiving-side device 2, in a case of obtaining the depth map expressed by different size of bits depending on a screen area of a two-dimensional image, applies the depth map expressed by the different size of bits depending on the screen area of the two-dimensional image to each pixel, and generates a stereoscopic vision-use image. For example, as shown in FIG. 7, when the CPU 26 receives information indicating that a pattern in which 3 bits are applied to the pixels in a peripheral area and 6 bits are applied to the pixels at a 50%-by-50% area is selected, the CPU 26 determines the size of bits of each depth value on the basis of the pattern specified by the received information. Or, in a case where information indicating the size of bits is written at the beginning of each depth value (pixel), it is possible to determine the size of bits of each depth value by the written information.

The receiving-side device 2, in a case of obtaining pieces of depth information of which number is fewer than the number of pixels of the two-dimensional image, generates a stereoscopic vision-use image by applying the depth information of the same value used in common to a plurality of pixels of the two-dimensional image. For example, as shown in FIG. 9(a), upon receiving information indicating that a pattern in which common depth information is applied to 3-by-3 pixels as one group in a peripheral area and common depth information is applied to 2-by-2 pixels as one group in a 50%-by-50% area is selected, the CPU 26 determines to which pixels as one group common depth information is applied on the basis of the pattern specified by the received information. Then, for example, a parallax image generating process is performed on three pixels on a first row from the left, three pixels on a second row from the left, and three pixels on a third row from the left in the two-dimensional image, that is, nine pixels in total, in the image generating portion 24, a common (one) parallax amount applied from the CPU 26 is utilized.

The receiving-side device 2 obtains first depth information applied to each object in the two-dimensional image and second depth information applied to the pixels constituting each object, generates depth information of each pixel by adding the second depth information to the first depth information, and generates a stereoscopic vision-use image on the basis of the depth information of each pixel. For example, as shown in FIG. 11, the receiving-side device 2 receives the images of image numbers 1 to 5 transmitted from the transmitting-side device, and the CPU 26 generates parallax amount information of each pixel on the basis of 2-bit depth map of each object in the image indicated by the image number 2 and the depth map of pixels constituting each object in the images indicated by the image numbers 3 to 5. The CPU 26 applies the parallax amount information to the image generating portion 24, and then, the image generating portion 24 generates a parallax image on the basis of the parallax amount information.

The receiving-side device 2 stores depth tables relating the depth information to each pixel in a pixel group constituting each shape (a sphere, a cylinder, a triangular pyramid, and the like) in the memory 27. Furthermore, the receiving-side device 2, when obtaining shape information of each object as subordinate information, selects a depth table corresponding to the shape and reads out the depth information. It is possible to match the depth map with a size of the object by performing processes such as a so-called pixel interpolating process and a pixel thinning process on the depth information (monochrome image). The CPU 26 generates the parallax amount information of each pixel by adding the depth information obtained from the table to the depth information applied to each object. The CPU 26 applies the parallax amount information to the image generating portion 24, and then, the image generating portion 24 generates a parallax image on the basis of the parallax amount information.

As described above, the present invention makes it possible to display various stereoscopic images. In addition, there is an advantage that information amount to be provided is reduced.

What is claimed is:

1. A stereoscopic vision-use image providing method, wherein at a time that a two-dimensional image is provided as data, depth information useful for converting the data of the two-dimensional image into a stereoscopic vision-use image and scale information of values of the depth information are provided as subordinate information of the two-dimensional image together with the data of the two-dimensional image, wherein
information indicating which value becomes an image displaying surface position out of the values of the depth information is included in the subordinate information.

2. A stereoscopic vision-use image providing method, wherein at a time that a two-dimensional image is provided as data, depth information useful for converting the data of the two-dimensional image into a stereoscopic vision-use image and definition information for allowing values corresponding to distances indicated by values of the depth information to have non-equal differences contrary to the values of the depth information having a uniform difference are provided as subordinate information together with the data of the two-dimensional image, wherein
information indicating which value becomes an image displaying surface position out of the values of the depth information is included in the subordinate information.

3. A stereoscopic vision-use image providing method according to claim 2, wherein the definition information is information specifying an arbitrary function out of a group of functions.

4. A stereoscopic vision-use image providing method according to claim 2, wherein the definition information is information specifying an arbitrary table out of a group of tables in which parallax amounts are predetermined with respect to the values of the depth information.

5. A stereoscopic vision-use image providing method according to any one of claims 2, 3, and 4, wherein the definition information is set such that an area where the non-equal differences are large is formed at a position far from an observer, and an area where the non-equal differences are small is formed at a position close to the observer.

6. A stereoscopic vision-use image providing method according to any one of claims 2, 3, and 4, wherein the definition information is set such that an area where the non-equal differences are large is formed at a position far from an image displaying surface position, and an area where the non-equal differences are small is formed at a position close to the image displaying surface position.

7. A stereoscopic vision-use image providing method according to claim 1 or 2, wherein information is provided by any one of methods such as broadcasting, communications, and a recording into a recording medium.

8. A stereoscopic image display device that generates a stereoscopic vision-use image by utilizing obtained data of a two-dimensional image and subordinate information thereof, comprising:
- a means for obtaining scale information and depth information from the subordinate information;
- a means for generating a parallax amount on the basis of the scale information and the depth information; and
- a means for generating a stereoscopic vision-use image on the basis of the parallax amount, wherein
- the means for generating the parallax amount determines a standard parallax amount on the basis of a depth value indicating an image displaying surface position included in the subordinate information.

9. A stereoscopic image display device that generates a stereoscopic vision-use image by utilizing obtained data of a two-dimensional image and subordinate information thereof, comprising:
- a means for obtaining depth information and function specifying information from the subordinate information;
- a means for storing a plurality of functions for allowing values corresponding to distances indicated by values of the depth information to have non-equal differences contrary to the values of the depth information having a uniform difference;
- a means for selecting a function on the basis of the function specifying information;
- a means for generating a parallax amount on the basis of the selected function and the depth information; and
- a means for generating a stereoscopic vision-use image on the basis of the parallax amount, wherein
- the means for generating the parallax amount determines a standard parallax amount on the basis of a depth value indicating an image displaying surface position included in the subordinate information.

10. A stereoscopic image display device that generates a stereoscopic vision-use image by utilizing obtained data of a two-dimensional image and subordinate information thereof, comprising:
- a means for obtaining depth information and table specifying information from the subordinate information;
- a means for storing a plurality of tables for allowing values corresponding to distances indicated by values of the depth information to have non-equal differences contrary to the values of the depth information having a uniform difference;
- a means for selecting a table on the basis of the table specifying information;
- a means for generating a parallax amount on the basis of the selected table and the depth information; and
- a means for generating a stereoscopic vision-use image by utilizing the parallax amount, wherein
- the means for generating the parallax amount determines a standard parallax amount on the basis of a depth value indicating an image displaying surface position included in the subordinate information.

\* \* \* \* \*